US 9,277,277 B2

(12) United States Patent
Choi

(10) Patent No.: US 9,277,277 B2
(45) Date of Patent: Mar. 1, 2016

(54) METHOD AND APPARATUS FOR CONTROLLING DISPLAY OF INFORMATION ON A TELEVISION

(76) Inventor: Eunhae Choi, Seoul (KR)

( * ) Notice: Subject to any disclaimer, the term of this patent is extended or adjusted under 35 U.S.C. 154(b) by 146 days.

(21) Appl. No.: 13/350,387

(22) Filed: Jan. 13, 2012

(65) Prior Publication Data

US 2012/0284763 A1 Nov. 8, 2012

(30) Foreign Application Priority Data

May 4, 2011 (KR) ........................ 10-2011-0042690

(51) Int. Cl.
| | |
|---|---|
| *H04N 5/445* | (2011.01) |
| *G06F 3/00* | (2006.01) |
| *G06F 13/00* | (2006.01) |
| *H04N 21/442* | (2011.01) |
| *H04N 21/462* | (2011.01) |
| *H04N 21/482* | (2011.01) |

(52) U.S. Cl.
CPC ..... *H04N 21/44209* (2013.01); *H04N 21/4622* (2013.01); *H04N 21/482* (2013.01); *H04N 2005/44517* (2013.01)

(58) Field of Classification Search
CPC  H04N 21/472; H04N 21/482; H04N 21/4823
USPC .............. 725/37, 40, 47, 48, 49, 59
See application file for complete search history.

(56) References Cited

U.S. PATENT DOCUMENTS

| | | | |
|---|---|---|---|
| 2002/0112237 A1* | 8/2002 | Kelts ............................... | 725/39 |
| 2006/0107294 A1* | 5/2006 | Rivlin et al. ..................... | 725/80 |
| 2007/0009229 A1 | 1/2007 | Liu | |
| 2007/0200727 A1* | 8/2007 | Sakamoto ................ | 340/825.25 |
| 2008/0065991 A1* | 3/2008 | Grimes et al. ................. | 715/719 |
| 2008/0141317 A1* | 6/2008 | Radloff et al. .................. | 725/87 |
| 2009/0125949 A1* | 5/2009 | Kimura ........................... | 725/59 |
| 2009/0270093 A1* | 10/2009 | Lee ................................. | 455/434 |
| 2010/0121972 A1* | 5/2010 | Samuels et al. ............... | 709/231 |
| 2011/0066673 A1 | 3/2011 | Outlaw | |
| 2011/0072105 A1 | 3/2011 | Biderman et al. | |

FOREIGN PATENT DOCUMENTS

| | | |
|---|---|---|
| EP | 0 921 689 A2 | 6/1999 |
| JP | 2002-261827 A | 9/2002 |
| JP | 2004-272262 A | 9/2004 |
| JP | 2007-135114 A | 5/2007 |

OTHER PUBLICATIONS

International Search Report dated Nov. 7, 2012 issued in Application No. PCT/KR2012/003491.
European Search Report for Application 12779943.5 dated Sep. 10, 2014.

* cited by examiner

*Primary Examiner* — Kyu Chae
(74) *Attorney, Agent, or Firm* — KED & Associates LLP

(57) ABSTRACT

An apparatus for a display device includes a controller and an interface coupled to at least one network. The controller determines network states for respective ones of a plurality of services and sets display features for corresponding ones of the services based on the detected network states. The network state of a first service is different from the network state of a second service, a display feature for the first service is set to be different from a display feature of the second service, and the display features for the first and second services are simultaneously displayed on the screen.

17 Claims, 8 Drawing Sheets

METHOD AND APPARATUS FOR CONTROLLING DISPLAY OF INFORMATION ON A TELEVISION

CROSS-REFERENCE TO RELATED APPLICATIONS

This application claims the benefit of Korean Application No. 10-2011-0042690, filed on May 4, 2011, the contents of which are incorporated by reference.

BACKGROUND

1. Field

One or more embodiments herein relate to control of network services.

2. Background

Televisions display a variety of types of information in addition to broadcast signal programming. This information includes on-demand movies, games, web browsers, websites, and other network-related information. When the television is used to display or otherwise provide access to network-based content, the state of the network will often determine the quality of service. The network state, however, cannot be known by a viewer until the viewer actually attempts to access the content. This creates delays and inconvenience.

DETAILED DESCRIPTION

Figure 1:
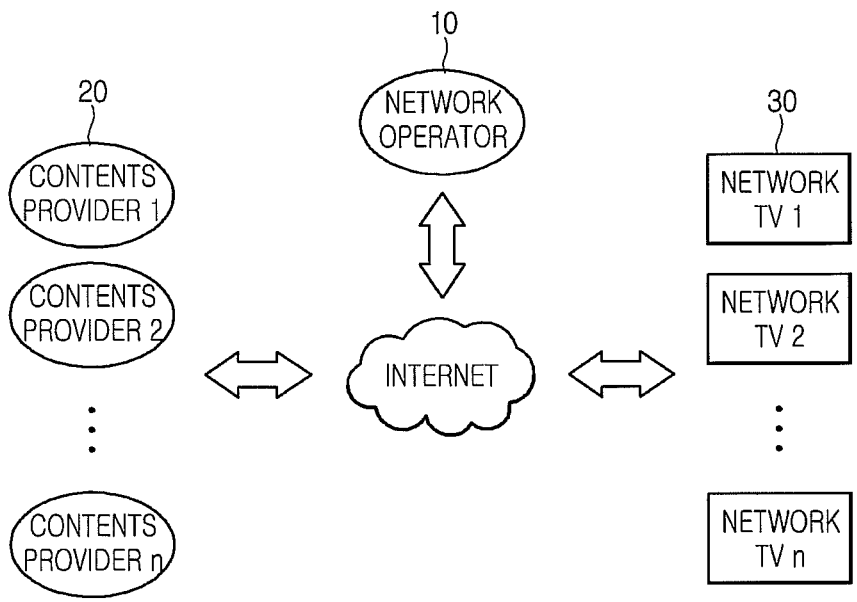
FIG. 1 shows an embodiment of a system for displaying network content.

FIG. 1 shows one embodiment of a system for displaying information transmitted over a network. The information may be received from a content provider and/or some other network-related source. The system includes a network operator 10, at least one content provider (CP) 20, and at least one network TV 30, which may be connected to each other by a network. The network may be the Internet and/or some other type of network. Although TVs are shown, in other embodiments display devices other than televisions may be included in the system, or a combination of TVs and other types of display devices may be included.

The network operator 10 may provide a base software required for contents provided by the content provider 20 to operate normally in the network TV 30 or software required for the network TV 30 to operate. Further, hardware information of the network TV 30 required for the contents to be normally executed in the network TV 30 may also be provided to the content provider 20.

The content provider 20 generates various types of content provided on the network and may configure the content in a format that can be reproduced in the network TV 30 to provide the content according to a request from the network TV 30. The content may be predetermined multimedia content which can be serviced through the network and/or other types of content. Also, the content provided by the content provider 20 may be provided directly to the network TV 30 through the Internet or may be provided to the network TV 30 through the network operator 10.

An exclusive firmware for reproducing and retrieving the contents and displaying the list for each content provider 20 may be mounted on the network TV 30. The firmware may be installed in the network TV 30 during manufacturing the network TV 30 or the user may download and install the firmware from the content provider 20 or the network operator 10 during using the network TV 30.

The network TV 30 may receive the content from the content provider 20 to reproduce or execute the content. The network TV 30 may include a TV including or coupled to a network module or a broadcast receiving device such as a set-top box, or may be a predetermined display device coupled to a network device such as a network phone. Although the broadcast receiving device having a broadcast receiving function is described as an example, other embodiments may be applied to other types of display devices which can access network content.

According to one embodiment, the content provider 20 may be a provider who makes or distributes various types of content to be provided to the network TV 30, and/or may provide services including at least one content, e.g., a TV broadcast a radio broadcast, a VOD, an AOD, a game, a video phone, weather information, a photograph, and the like through the network such as the Internet.

The network TV basically has a network interface capable of accessing the network and is allocated with an IP address to receive and process data packets through the network, and may store or reproduce the data packets when the data packets are multimedia data such as video, audio, and the like.

The network TV 30 may transmit user requirements bi-directionally while processing multimedia data. Further, buttons for controlling the network TV, i.e., buttons for selecting various menus are preferably provided in a user input unit such as a remote controller or a control button for controlling the network TV 30.

According to an alternative embodiment, the display system shown in FIG. 1 may not include the network operator. In this case, the network TV 30 may directly access the content provider 20, e.g., a server of the content provider 20, using a wired network, wireless network, and/or a combination thereof to receive content.

Figure 2:
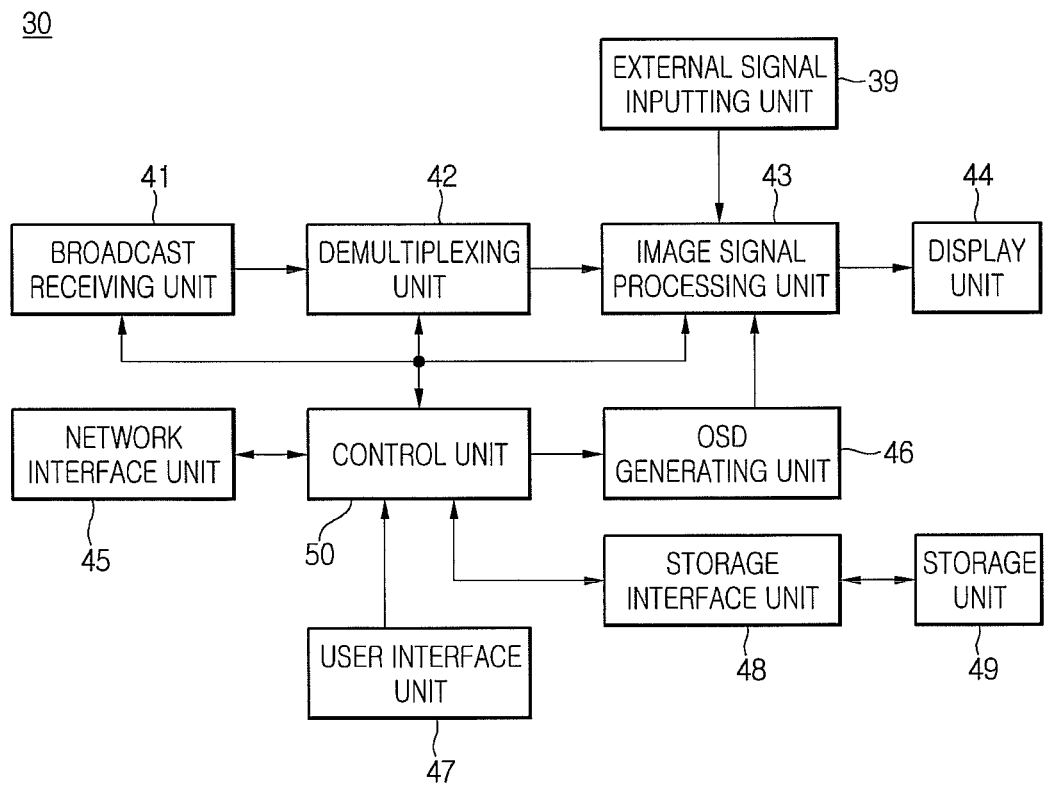
FIG. 2 shows an example of a display device in the system.

FIG. 2 shows an example of the network TV 30, which may receive an RF-signal-type broadcasting signal using a broadcast receiving unit 41 wirelessly or through a cable system in addition to receiving content through the network.

As shown in FIG. 2, the network TV 30 includes a broadcast receiving unit 41, a demultiplexing unit 42, an image signal processing unit 43, a display unit 44, a network interface unit 45, an OSD generating unit 46, a user interface unit 47, a storage interface unit 48, a storage unit 49, an external signal inputting unit 39, and a control unit 50. Among these components, the broadcast receiving unit 41, the demultiplexing unit 42, and the image signal processing unit 43 may constitute one broadcast processing unit that receives and processes the received broadcasting signal as or into a format which can be outputted to the display unit 44 through various processing operations.

In the case of digital broadcasting, a digital broadcasting signal may be transmitted as a transport stream format packetized, for example, by time-division multiplexing a video signal and an audio signal, and additional data.

The broadcast receiving unit 41 includes an antenna receiving a broadcasting signal transmitted from the outside and may include a tuner tuning a broadcasting signal having a frequency band corresponding to a tuning control signal of the control unit 50 to be described below according to the tuning control signal and a demodulator outputting a broadcasting signal of a predetermined tuned channel through a vestigial sideband (VSB) demodulating process and an error correcting process of the broadcasting signal.

Further, the broadcasting signal received through the broadcast receiving unit 41 is divided into various additional data defined as the video signal and the audio signal, and program and system information protocol (PSIP) information by the demultiplexing unit 42 to be outputted as a bit stream format.

The video data divided through the demultiplexing unit 42 are processed by the image signal processing unit 43 to be displayed in the display unit 44.

The image signal processing unit 43 may include an MPEG-2 decoder and a scaler converting the video data to match a vertical frequency, resolution, a screen ratio, and the like which are dependent on an output specification of the display unit 44.

The display unit 44 may display images by using various types of display panels such as, for example, a digital light processing (DLP), a liquid crystal display (LCD), a plasma display panel (PDP), or the like.

The audio signal is processed by a voice signal processing unit (not shown) and outputted to a speaker. The voice signal processing unit may include, for example, an AC-3 decoder. Meanwhile, additional data included in the additional data divided through the demultiplexing unit 42 may be stored in storage unit 49 through the storage interface unit 48 to be described below.

The storage unit 49 may be implemented, for example, by an electrically erasable programmable read-only memory (EEPROM), or another type of storage device may be used.

The user interface unit 47 may receive a request command from the user. According to one embodiment, the user interface unit may include an infrared receiving portion for receiving an infrared signal inputted through the remote controller or a local key input portion provided at one side of a panel. In other embodiments, the user interface unit may receive RF signals or captured image signals interpreted using recognition software.

The network interface unit 45 may receive content or data from the content provider 20 or the network operator 10 through the network. For example, the network interface unit 45 may access the server of the content provider 20 through the wired/wireless network such as the Internet and may receive contents such as a broadcast, a game, a VOD, and a broadcasting signal provided from the content provider and information related thereto. Further, update information and update files of firmware provided by the network operator 10 may be received through network interface unit 45.

The OSD generating unit 46 may generate a menu and/or other type of screen for receiving a user judgment signal as an on-screen display (OSD) format. That is, the OSD generating unit 46 may display content and related information received through the network interface unit 45 through the display unit 44.

The external signal inputting unit 39 is an interface capable of receiving inputs from other reproducing devices, e.g., a DVD player, a game machine. Other reproducing devices are connected to the external signal inputting unit 39 to display multimedia stored in the reproducing devices to the display unit 44.

The control unit 50 may perform an overall operational control depending on the command inputted from the user interface unit 47. As will be explained, according to one embodiment, the image display device having the configuration shown in FIG. 2 may display a list of the services which can be received by accessing the network.

Figure 3:
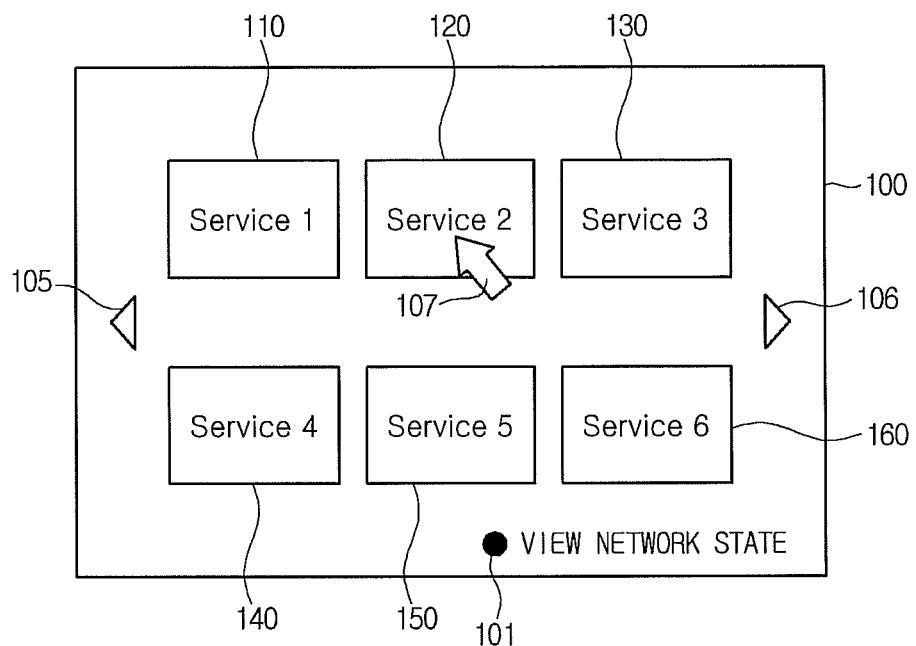
FIG. 3 shows an example of a screen generated by one embodiment of a method for controlling display of content on a display device.

FIG. 3 shows one embodiment of an image display device (e.g., network TV 30) which displays on a screen 100 a service list including information on each of a plurality of services which can be provided from a plurality of content providers through a network such as the Internet.

For example, in response to user's request for displaying the service list, the control unit 50 controls the network interface unit 45 to receive information on services which can be provided from servers of the plurality of content providers by accessing the servers of the plurality of content providers and may configure the service list by using the received information on the services. The plurality of services included in the service list may be services preferentially registered or selected by the user and/or services previously registered by a manufacturer of the image display device.

The service information included in the service list may be displayed on the screen 100, for example, as icons 110 to 160 corresponding to the plurality of services, respectively as shown in FIG. 3. The service icons 110 to 160 may include information on the respectively corresponding services (alternatively, the content providers). In other embodiments, thumbnail images, graphical data, or other information may be displayed to correspond to the services.

For example, a first service icon 110 includes information on a service provided from a server operated by a predetermined content provider and the service corresponding to the first service icon 110 may be a VOD service providing video contents such as a movie according to a request from the user.

The user may select any one of the services in the service list displayed on the screen 100 to allow the image display device to access a sever of a content provider that provides the selected service and receive contents provided therefrom. For example, the user moves a pointer 107 displayed on the screen 100 to a location where a "Service 2" icon 120 is displayed by using the user interface unit 47 and thereafter, selects the corresponding icon 120 to verify information on the receivable contents through the "Service 2".

Further, when the information on the receivable services through accessing the network cannot be displayed on one screen, the user selects navigation keys 105 and 106 displayed on the screen 100 to verify information on services that are not displayed on the screen 100 at present.

According to one embodiment, the image display device may detect a network state for each service, compare a required target bit rate with the detected network state for each service, and determine a display location of icons or other identifying information for each service in the service list according to the comparisons.

For example, when the user selects a "View network state" button 101 on the screen 100 shown in FIG. 3, display locations of the service information (i.e., service icons 100 to 160 including the corresponding information) displayed on the screen 100 may be changed depending on a current network state between the server providing each service and the image display device.

Figure 4:
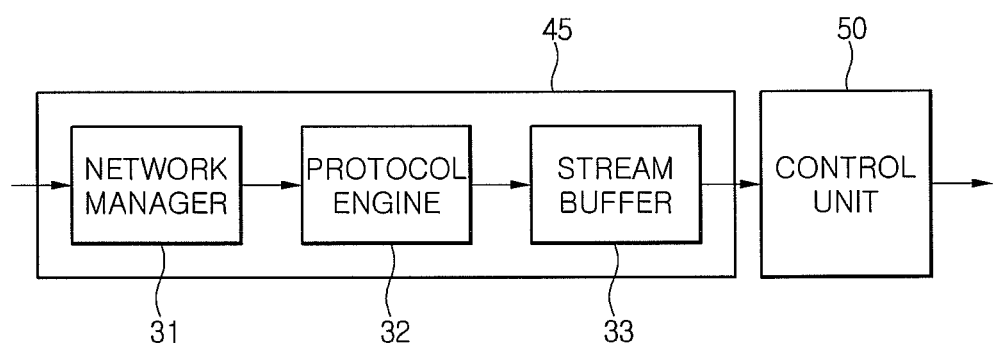
FIG. 4 shows an example of a network interface unit for the display device.

FIG. 4 shows an example of network interface unit 45 in the image display device. The network interface unit 45 may include a network manager 31, a protocol engine 32, and a stream buffer 33.

The network interface unit 45 accesses a plurality of content provider servers previously registered to collect data for detecting the network state for each service according to the control of the control unit 50. For example, the network interface unit 45 may transmit sample data of a predetermined bit rate to each content provider server and receives a response message to the sample data from the server and the control unit 50 may measure data transmission and reception speeds between the server and the image display device by using the received response message.

The control unit 50 may estimate an available bandwidth of the network which can receive the service from the server according to the measured data transmission and reception speeds to detect the network state for each service.

The network manager 31 in network interface unit 45 may access the content provider servers to transmit and receive data and a protocol engine 32 may process the transmitted and receive data according to a predetermined network protocol.

The stream buffer 33 may temporarily store a data stream which is processed by the protocol engine and thereafter, inputted and thereafter, output the data stream to the control unit 50.

The control unit 50 may determine a display location of an icon or other identifying information for each service based on a comparison of the network state of each service and a target bit rate required for receiving the corresponding service. The control unit may then control the display unit 44 to display the icons or other identifying information of the plurality of services on screen 100 as the service list according to the determined display locations.

The target bit rate may represent a bit rate at which a stream provided from the content provider server is transcoded and may be previously stored in the storage unit 49 of the image display device for each service. In other embodiments, the target bit rate may correspond to other types of bit rates. Meanwhile, the target bit rate for each service stored in the storage unit 49 may be updated and an interface for updating the target bit rate may be provided to the content provider.

As a result, the content provider may update the target bit rate stored in the image display device through a browser using the provided interface. Alternatively, by using data received from a service delivery platform (SDP) server, the target bit rate for each service stored in the storage unit 49 may be updated.

Figure 5:
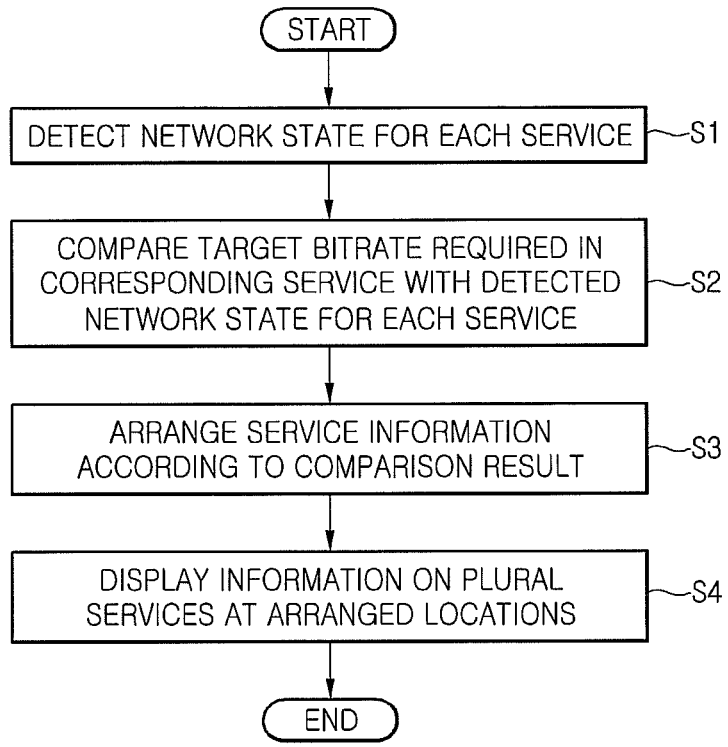
FIG. 5 shows operations in one embodiment of a method for controlling the display of a list of network-related services and/or content.

FIG. 5 shows one embodiment of a method for displaying a service list. According to this method, control unit 50 of the image display device detects a network state for each service (step S1) and compares a target bit rate required in a corresponding service with the detected network state for each service (step S2). For example, the control unit 50 may measure data transmission and reception speeds for each of a plurality of services indicated in a service list using the network interface unit and may detect an available bandwidth of a network for each service according to the measured data transmission and reception speeds.

Thereafter, the control unit 50 compares the detected network available bandwidth for each service with the target bit rate for each service stored in the storage unit 49 to verify whether a target bit rate for each of a plurality of services is included in a receivable range in the detected network available bandwidth. For example, the control unit 50 verifies whether the target bit rate for each of the plurality of services is included in the receivable range in the network available bandwidth to divide the services into a plurality of groups according to a current network state.

In the case of the service list shown in FIG. 3 as an example, the control unit 50 compares the network available bandwidth detected in step S1 with the target bitrate stored in the storage unit 49 with respect to "Service 1" and when the target bitrate is more than the receivable range in the network available bandwidth, the control unit 50 classifies a network state of the "Service 1" as "bad", when the target bitrate is included in the receivable range in the network available bandwidth, the control unit 50 classifies the network state of the "Service 1" as "normal", and when the target bitrate is less than the receivable range in the network available bandwidth, the control unit 50 classifies the network state of the "Service 1" as "good".

Meanwhile, the control unit 50 may perform the classifying operation according to the network state even with respect to other "Service 2" to "Service 6" (alternatively, further including other services not displayed on the screen 100).

Thereafter, the control unit 50 arranges service information include in the service list according to the comparison result and the display unit 44 displays information on a plurality of services at the arranged locations under the control of the control unit 50 (step S4).

Figure 6:
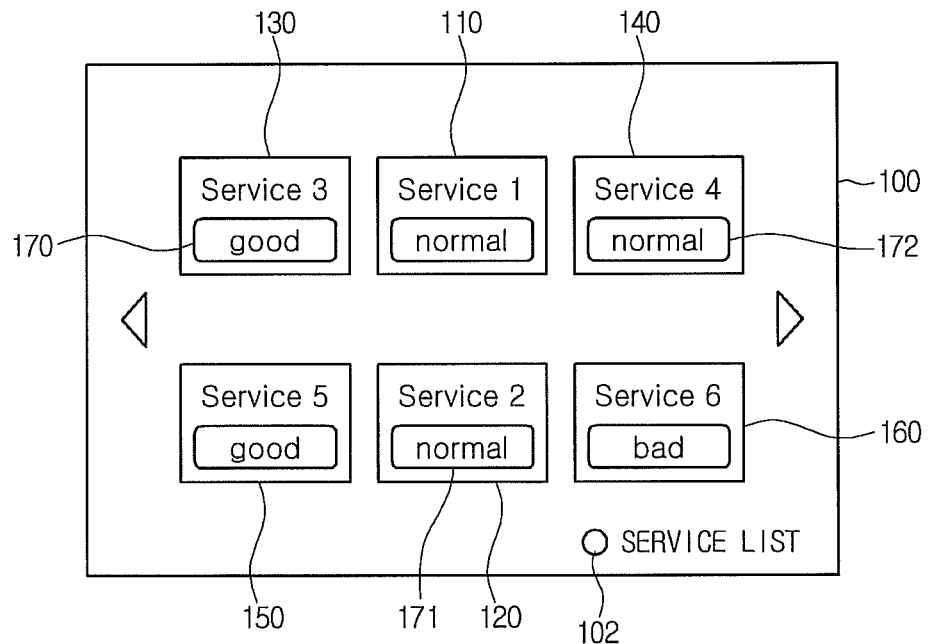
FIGS. 6 to 11 show examples of screens generated by one embodiment of a method for arranging and displaying service information depending on network state.

Referring to FIG. 6, the display locations of the service information included in the service list may be changed to the order in which the network state judged based on the target bit rate is excellent.

For example, when the control unit 50 judges network states of "Service 3" and "Service 5" as "good", network states of "Service 1", "Service 2", and "Service 4" as "normal", and a network state "Service 6" as "bad", on the basis of the target bitrate and the network available bandwidth in step S2, the service icons 110 to 160 are arranged from the left to the right and from top to the bottom according to the order in which the network state is excellent to be displayed on the screen 100, as shown in FIG. 6.

To this end, the control unit 50 designates the display location of each service information by matching identification information (e.g., IDs of the icons) of the service icons 110 to 160 according to the arranged order and loads the corresponding service information according to the designated location to display the service list shown in FIG. 6 on the screen 100. The service information may be, as indicated, an icon, thumbnail image, text, graphics, or other information used to identify an associated service or network-related content.

As a result, the user may recognize that contents can be successively received by using "Service 3" and "Service 5." Further, the user may smoothly receive the contents by using "Service 1", "Service 2" and "Service 4", but may recognize that the contents cannot be smoothly received by using "Service 6" because the network state of "Service 6" is bad.

One embodiment classifies the current network states of the plurality of services included in the service list are classified as "good", "normal", and "bad" according to the network state for each service judged based on the target bit rate as an example. In other embodiments, different indicators or classifications may be used. For example, the control unit 50 may classify the plurality of services included in the service list into 2 or 4 or more groups according to the network state for each service judged based on the target bit rate and may convert the judged network states into predetermined values and display the converted values directly on the screen 100.

Further, in accordance with one embodiment, the image display device may display the judged network states as texts 170, 171, and 172 shown in FIG. 6 to correspond to the corresponding service icons, but besides, the image display device may transfer the information on the network states to the user by using different images or colors.

Figure 7:
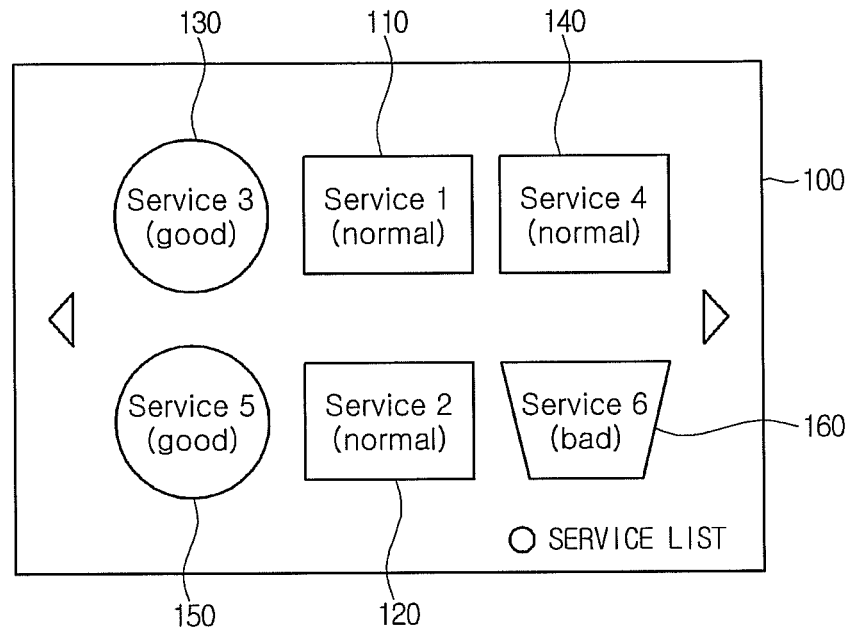

Referring to FIG. 7, the icons 130 and 150 corresponding to "Service 3" and "Service 5" in which the current network states are judged as "good" may be displayed in a circular shape, the icons 110, 120, and 140 corresponding to "Service 1", "Service 2", and "Service 4" in which the current network states are judged as "normal" may be displayed in a rectangular shape, and the icon 160 corresponding to "Service 6" in which the current state is judged as "bad" may be displayed in a rhombus shape.

Figure 8:
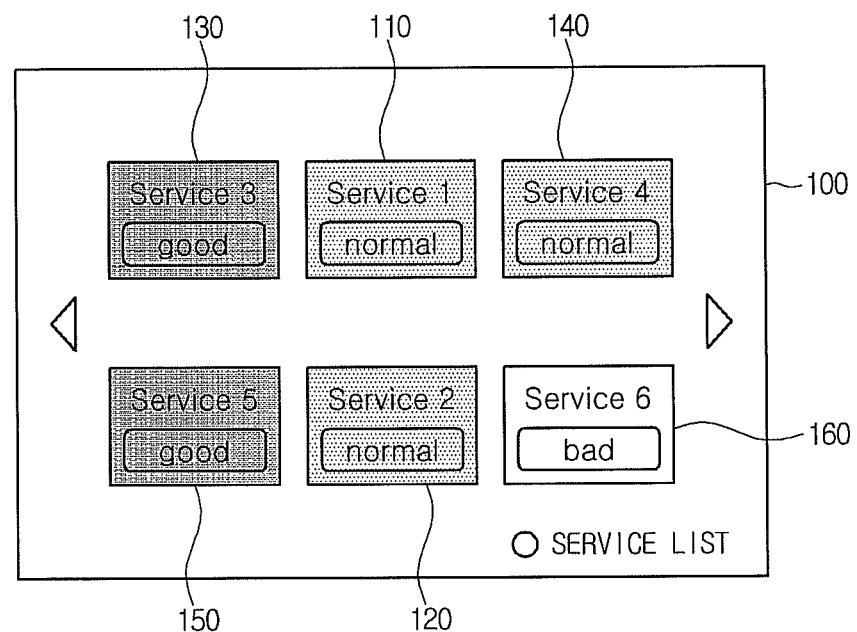

Meanwhile, as shown in FIG. 8, the displayed color or transparencies may be changed depending on the current network states of the corresponding services corresponding to the icons 110 to 160 included in the service list, such as "good", "normal", and "bad".

Figure 9:
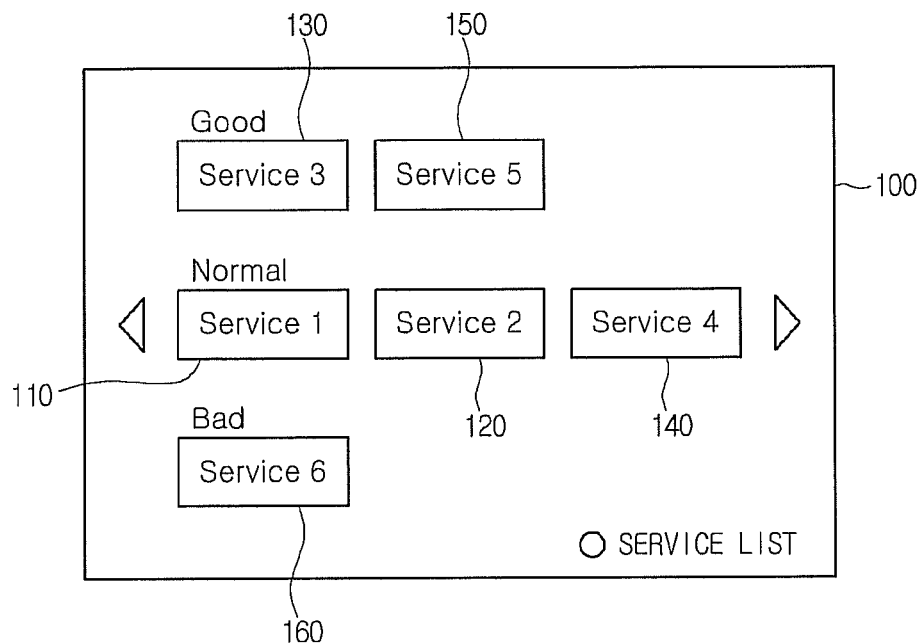

Referring to FIG. 9, the display unit 44 may display the service information for each of the classified groups on the screen 100. That is, the icons 130 and 150 corresponding to "Service 3" and "Service 5" may be displayed on the screen 100 as a group in which the current network state is "good", the icons 110, 120, and 140 corresponding to "Service 1", "Service 2", and "Service 4" may be displayed as a group in which the current network state is "normal", and the icon 160 corresponding to "Service 6" may be displayed as a group in which the current network state is "bad." As such, the icons may be displayed at different designated areas on the screen 100.

Further, a display size of the service information included in the service list on the screen 100 may be adjusted according to the network state judged based on the target bit rate.

Figure 10:
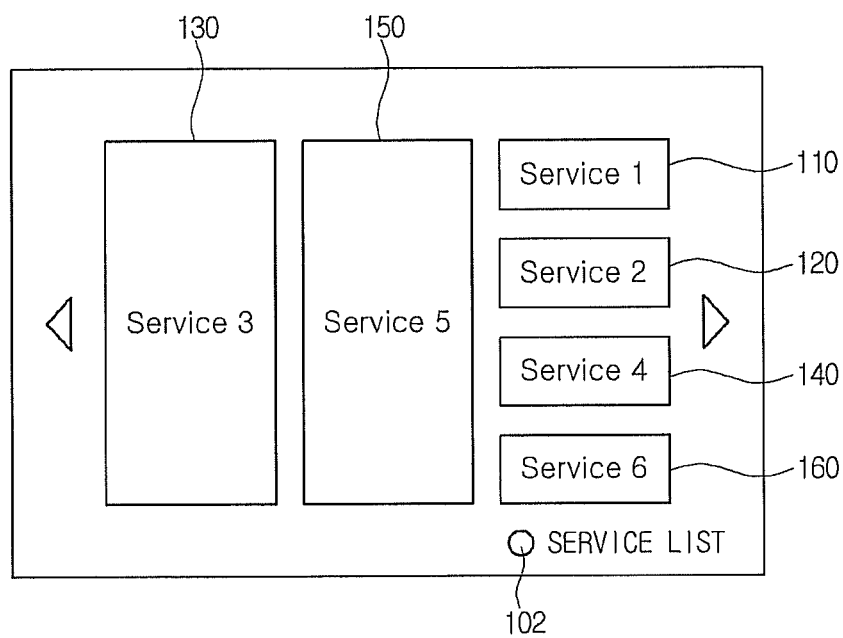

Referring to FIG. 10, the icons 130 and 150 corresponding to "Service 3" and "Service 5" in which the current network states are judged as "good" may be displayed on the screen 100 in the largest size, the icons 110, 120, and 140 corresponding to "Service 1", "Service 2", and "Service 4" in which the current network states are judged as "normal" may be displayed in the next largest size, and the icon 160 corresponding to "Service 6" in which the current state is judged as "bad" may be displayed in the smallest size.

Information on at least one content which can be reproduced (alternatively, purchased) through the corresponding service may be displayed in the service icons 110 to 160 and as shown in FIG. 10, more contents information for the service in which the network state is good may be transferred to the user by changing the size of the icon according to the network state.

According to another embodiment, in the case where the service information is included in the service list, a distance from a predetermined location on the screen 100 to a location wherein the service information may be displayed may be adjusted according to the current network state of the corresponding service.

Figure 11:
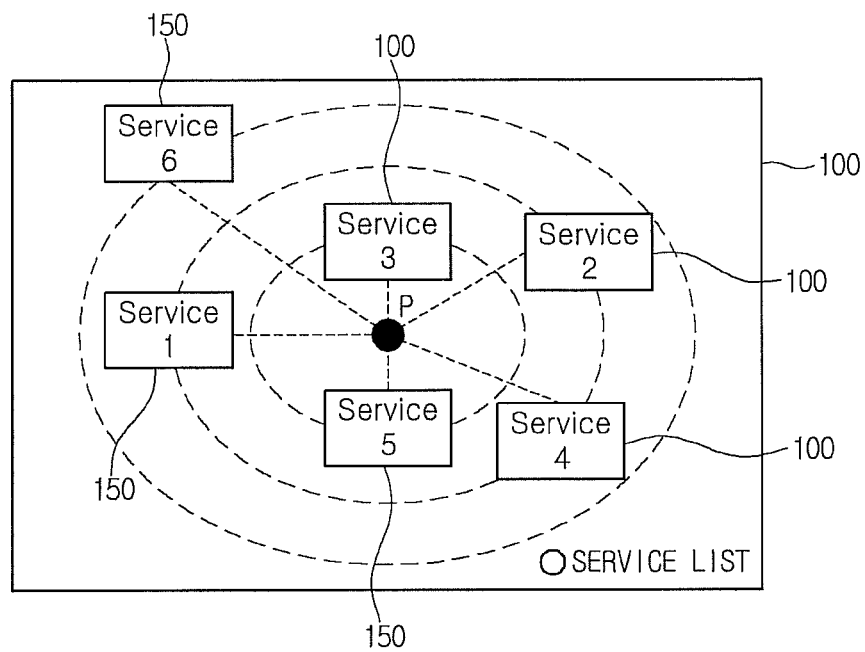

Referring to FIG. 11, the icons 130 and 150 corresponding to "Service 3" and "Service 5" in which the current network states are judged as "good" may be displayed at locations closest from a center location P of the screen 100, the icons 110, 120, and 140 corresponding to "Service 1", "Service 2", and "Service 4" in which the current network states are judged as "normal" may be displayed at locations next closest, and the icon 160 corresponding to "Service 6" in which the current state is judged as "bad" may be displayed at a location farthest from the center location P.

Figure 12:
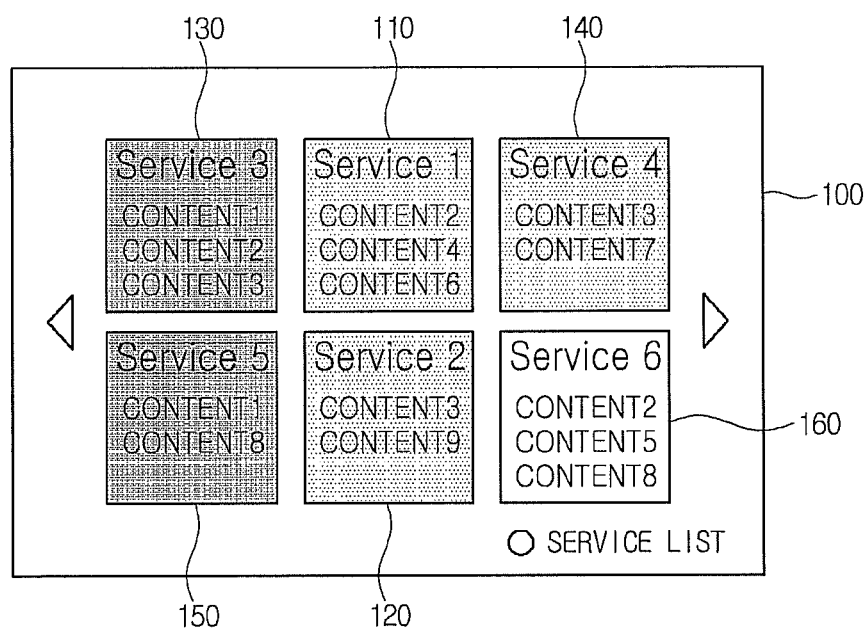
FIGS. 12 and 13 show examples of screens generated by one embodiment of a method for displaying information corresponding to network-related services and/or content in association with a service list.
Figure 13:
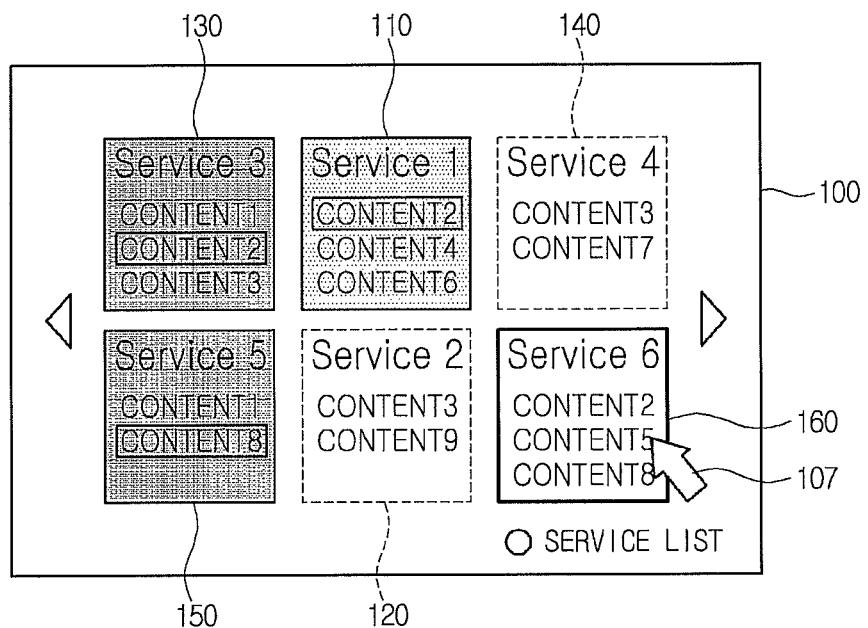

FIGS. 12 and 13 show exemplary embodiments of a method for displaying contents information which can be reproduced by using a predetermined service in a service list. Referring to FIG. 12, each of the service icons 110 to 160 included in the service list may include information on the contents which can be reproduced (alternatively, purchased) through the corresponding service.

For example, the contents information may include a name, a type, a reproduction time, or a purchasing price of the content information and some (e.g., representative content designated by the corresponding content provider) of the content which can be reproduced through the service may be displayed in the service icon.

According to one embodiment, when a user selects one of the plurality of services included in the service list, another service providing the same content as the contents provided through the selected service may be identified on the screen 100.

Referring to FIG. 13, when the user locates a pointer 107 on the "Service 6" icon 160, the icons 110, 130, and 150 corresponding to services providing the same contents as any one of the contents provided through the "Service 6", i.e., "Service 1", "Service 3", and "Service 5" may be identified and displayed on the screen 100. For example, information on "contents 2" or "contents 8" (i.e., information on the same contents as the contents provided through the "Service 6") in the icons 110, 130, and 150 corresponding to "Service 1", "Service 3", and "Service 5" is highlighted and other icons 140 and 150 may be displayed in an inactivated state.

That is, when the user locates the pointer 107 on the corresponding icon 106 in order to use "Service 6" in which the current network state is bad, information on other services (e.g., services in which the network state is better than the "Service 6") which can provide the contents reproducible through the "Service 6" is displayed to be identified on the service list, such that contents which the user intends to purchase may be induced to be provided under a better network environment.

According to another embodiment, a content provider providing a predetermined service may provide the corresponding service at multiple target bit rates. In this case, two or more service network states may be displayed on the service list, one for each respective target bit rate.

Figure 14:
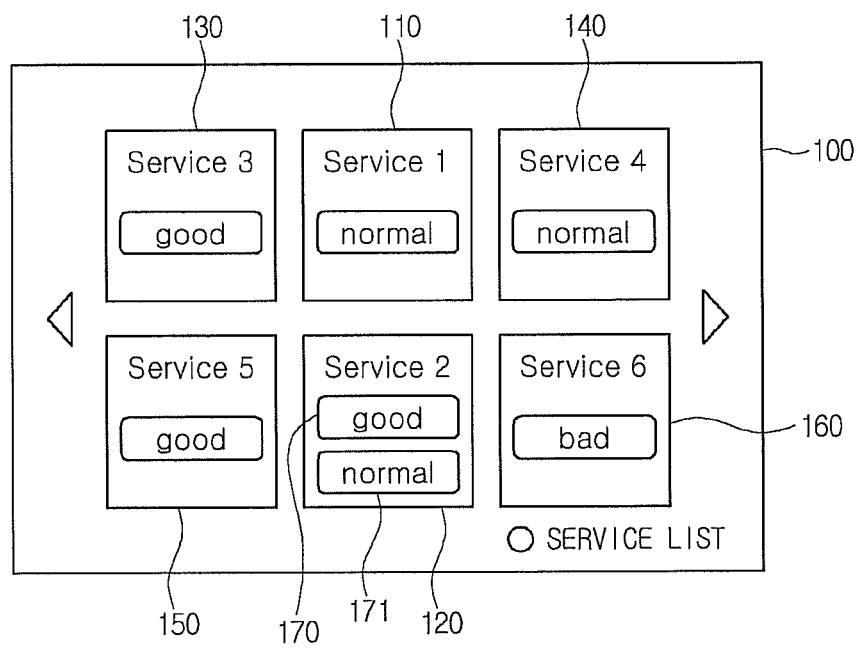
FIGS. 14 to 16 show examples of screens generated by one embodiment of a method for displaying information indicative of two or more network states for a given network-related service or content.
Figure 15:
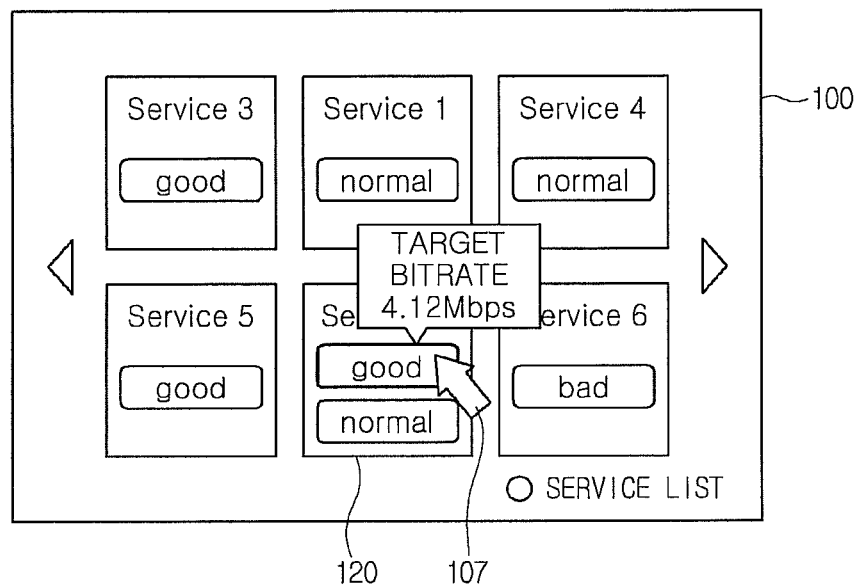
Figure 16:
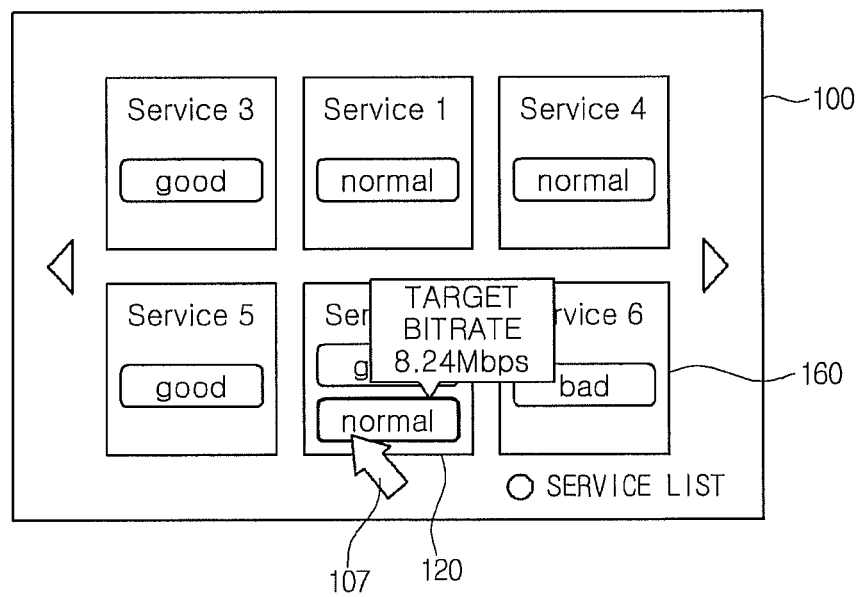

FIGS. 14 to 16 show embodiments of a method for displaying two or more network states for a same service based on respective target bit rates. Referring to FIG. 14, a content provider providing "Service 2" may designate two or more target bit rates for a corresponding service. As a result, text 170 indicating that the current network state is "good" and the text 171 indicating that the current network state is "normal" may be both displayed simultaneously on icon 120 corresponding to the "Service 2". For example, the content provider may provide "Service 2" at a target bit rate of 8.24 Mbps and in addition, may provide the "Service 2" at 4.12 Mbps lower than the target bit rate.

The two or more target bit rates designated with respect to a same service may correspond to the bit rates at which the same content may be received but with different resolutions. For example, "Service 2" provided at a target bit rate of 8.24 Mbps may provide content at a high-definition (HD) resolution and "Service 2" provided at a target bit rate of 4.12 Mbps may provide the same content at a standard-definition (SD) resolution.

As a result, a user may select whether to receive the content in SD resolution in the good network state or the content in HD resolution in a normal network state with respect o the predetermined image contents provided through the "Service 2." That is, the contents provided through "Service 2" at the target bit rate of 8.24 Mbps may be higher than the contents provided through the "Service 2" at the target bit rate of 4.12 Mbps in resolution of the image or quality of voice.

As shown in FIG. 15, when a user locates the pointer 107 on the text 170 indicating "good" in the "Service 2" icon 120, the target bit rate (i.e., 4.12 Mbps) of the "Service 2" provided through the good-state network may be displayed on screen 100.

As shown in FIG. 16, when a user locates the pointer 107 on the text 171 indicating "normal" in the "Service 2" icon 120, the target bit rate (i.e., 8.24 Mbps) of the "Service 2" provided through the normal-state network may be displayed on screen 100.

As a result, when the user puts more emphasis on image resolution by considering both the quality of the contents and the network state, the user may select the text 170 indicating "good" in the "Service 2" icon 120 to use the "Service 2" provided at the target bit rate of 8.24 Mbps. And, when the user puts more emphasis on the network state, the user selects the text 171 indicating "normal" to use the "Service 2" provided at the target bit rate of 4.12 Mbps.

According another embodiment, by arranging and displaying information on the plurality of services included in the service list according to the network state judged based on the target bit rate, user accessibility to a service in which a network quality is excellent can be improved, and as a result, inconvenience in which the service provided through network connection is interrupted can be suppressed.

The embodiments described herein may be implemented, in whole or part, by one or more programs to be executed by a processor. The programs may be stored in a computer-readable medium, examples of which include a ROM, a RAM, a CD-ROM, a magnetic tape, a floppy disk, an optical data storage, and the like and in addition, include a type of a carrier wave (e.g., transmission through the Internet).

The computer-readable recording media may be distributed on computer systems connected or coupled through a network, and thus the computer-readable recording media may be stored and executed as the computer-readable code by a distribution scheme. In addition, functional programs, codes, and code segments for implementing the method can be easily deduced by programmer skilled in the art.

One or more of the aforementioned embodiments, therefore, provide a method for displaying a list services which can be received through network connection and an image display device using the same.

In accordance with one embodiment, a method for displaying a service list includes: detecting a network state for each service by measuring data transmission and reception speeds to and from servers providing a plurality of services, respectively; comparing a target bitrate required in the corresponding service with the detected network state for each service; and arranging information on the plurality of services according to the comparison result and displaying the information on a screen.

In accordance with another embodiment, Meanwhile, a computer-readable medium stores a program for executing any of the embodiments of the methods described herein.

In accordance with another embodiment, an image display device includes: a network interface unit transmitting and receiving data for providing the service by accessing a content provider server; a control unit detects a network state for each service by measuring data transmission and reception speeds to and from servers providing a plurality of services, respectively by using the network interface unit and determining a display location of service information on the basis of the detected network state for each service and a target bit rate required in the corresponding service; and a display unit displaying information on the plurality of services on a screen according to the determined display location.

In accordance with another embodiment, an apparatus for a display device comprises an interface coupled to at least one network; and a controller to determine network states for respective ones of a plurality of services and to set display features for corresponding ones of the services based on the detected network states, wherein the network state of a first service is different from the network state of a second service, wherein a display feature for the first service is set to be different from a display feature of the second service, and wherein the display features for the first and second services are simultaneously displayed on the screen. The display device may be a television or other type of display device. Also, the apparatus may be located within the display device or included with a device (e.g., set-top box, Internet or multimedia box, etc.) coupled to the display device.

The display features for the first and second services may correspond to a different order of information identifying the first and second services, may correspond to different display shapes of information identifying the first and second services, may correspond to different degrees of shading of information identifying the first and second services, and/or may correspond to different textual descriptions indicating the different network states for the first and second services.

The display features for the first and second services may correspond to displaying an indicator identifying the first and second services in different display groups, each group corresponding to a different network state.

The display features for the first and second services may correspond to different degrees of color of information identifying the first and second services or may correspond to different sizes of visual information identifying the first and second services.

The display features may be indicative of different network states for the first service are displayed on the screen, the different network states of the first service corresponding to different speeds at which content may be received from the first service.

The controller may determine the network states of the first and second services by comparing the transmission speeds of content to be received from the first and second services to a predetermined target bit rate.

In accordance with another embodiment, a method for controlling a display device comprises detecting network states for respective ones of a plurality of services; setting display features for corresponding ones of the services based on the detected network states, wherein: a network state of a first service is different from a network state of a second service, the display feature for the first service is set to be different from the display feature of the second service, and the display features for the first and second services are simultaneously displayed on the screen. The display device may be a television or other type of display device.

The display features for the first and second services may correspond to different display locations of information identifying the first and second services, to a different display order of the information identifying the first and second services, to different display shapes of information identifying the first and second services, and/or to different degrees of shading of information identifying the first and second services.

The display features for the first and second services may correspond to different textual descriptions indicating the different network states for the first and second services, and/or to different display locations, each location corresponding to a different network state. The display features for the first and second services may correspond to different degrees of shading of information identifying the first and second services. The display features for the first and second services may correspond to different sizes of visual information identifying the first and second services.

The display features may be indicative of different network states for the first service are displayed on the screen, the different network states of the first service corresponding to different speeds at which content may be received from the first service.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more of the other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus, comprising:
a display unit;
a network interface configured to receive a content from a content provider through a network; and
a controller configured to:
measure data transmission speed or data reception speed for each of a plurality of services,
detect a network state for each one of the plurality of services using the measured data transmission speed or data reception speed,
control the display unit to display, differently, on a screen, a plurality of service icons according to the detected network state for each service, wherein the plurality of service icons that respectively correspond to the plurality of services includes a first service and a second service, wherein the first service corresponds to a first service icon and the second service corresponds to a second service icon, the first service icon corresponds to a first content provided through the first service, and the second service icon corresponds to a second content provided through the second service, the first content and the second content being a same content, and the network state of the first service is better than the network state of the second service, and
highlight the first content corresponding to the first service icon when a pointer is provided on the second service icon to indicate the network state of the first content corresponding to the first service icon highlighted is better than the network state of the second service icon.

2. The apparatus of claim 1, wherein a display feature for the first service and a display feature of the second service correspond to a different order of information identifying the first and second services.

3. The apparatus of claim 2, wherein the display features for the first and second services correspond to different display shapes of information identifying the first and second services.

4. The apparatus of claim 2, wherein the display features for the first and second services correspond to different degrees of shading of information identifying the first and second services.

5. The apparatus of claim 2, wherein the display features for the first and second services correspond to different textual descriptions indicating the different network states for the first and second services.

6. The apparatus of claim 2, wherein the display features for the first and second services correspond to displaying an indicator identifying the first and second services in different display groups, each group corresponding to a different network state.

7. The apparatus of claim 2, wherein the display features for the first and second services correspond to different degrees of color of information identifying the first and second services.

8. The apparatus of claim 2, wherein the display features for the first and second services correspond to different sizes of visual information identifying the first and second services.

9. The apparatus of claim 2, wherein display features indicative of different network states for the first service are displayed on the screen, the different network states of the first service corresponding to different speeds at which content may be received from the first service.

10. A method, comprising:
measuring data transmission speed or data reception speed for each of a plurality of services;
detecting a network state for each one of the plurality of services using the measured data transmission speed or data reception speed;
displaying, differently, on a screen, a plurality of service icons according to the detected network state for each service, wherein the plurality of service icons that respectively correspond to the plurality of services including a first service and a second service, the first service corresponds to a first service icon and the second service corresponds to a second service icon, the first service icon corresponds to a first content provided through the first service, and the second service icon corresponds to a second content provided through the second service, the first content and the second content being a same content, and the network state of the first service is better than the network state of the second service; and
highlighting the first content corresponding to the first service icon when a pointer is displayed at the second service icon to indicate the network state of the first content corresponding to the first service icon highlighted is better than the network state of the second service icon.

11. The method of claim 10, wherein a display feature for the first service and a display feature of the second service correspond to different display locations of information identifying the first and second services.

12. The method of claim 11, wherein the display features for the first and second services correspond to different display shapes of information identifying the first and second services.

13. The method of claim 11, wherein the display features for the first and second services correspond to different degrees of shading of information identifying the first and second services.

14. The method of claim 11, wherein the display features for the first and second services correspond to different textual descriptions indicating the different network states for the first and second services.

15. The method of claim 11, wherein the display features for the first and second services correspond to different display locations, each location corresponding to a different network state.

16. The method of claim 11, wherein the display features for the first and second services correspond to different sizes of visual information identifying the first and second services.

17. The method of claim 11, wherein display features indicative of different network states for the first service are displayed on the screen, the different network states of the first service corresponding to different speeds at which content may be received from the first service.

* * * * *